(12) United States Patent
Jahnke (10) Patent No.: US 7,563,168 B2
(45) Date of Patent: *Jul. 21, 2009

(54) AUDIO EFFECT RENDERING BASED ON GRAPHIC POLYGONS

(75) Inventor: Steven R. Jahnke, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 1159 days.

This patent is subject to a terminal disclaimer.

(21) Appl. No.: 10/779,238

(22) Filed: Feb. 13, 2004

(65) Prior Publication Data

US 2005/0182608 A1    Aug. 18, 2005

(51) Int. Cl.
*G06F 9/06* (2006.01)
(52) U.S. Cl. ....................................................... 463/35
(58) Field of Classification Search .................... 463/1; 381/61; 345/419
See application file for complete search history.

(56) References Cited

U.S. PATENT DOCUMENTS 5,337,363 A * 8/1994 Platt ............................. 381/17
5,633,993 A * 5/1997 Redmann et al. ............ 345/419
5,774,131 A * 6/1998 Kim ............................. 345/503
6,266,517 B1 * 7/2001 Fitzpatrick et al. ........ 455/114.3
6,540,613 B2 * 4/2003 Okubo et al. ................ 463/35
6,544,122 B2 * 4/2003 Araki et al. .................. 463/35
6,599,195 B1 * 7/2003 Araki et al. .................. 463/43

* cited by examiner

*Primary Examiner*—Dmitry Suhol
*Assistant Examiner*—Masud Ahmed
(74) *Attorney, Agent, or Firm*—Robert D. Marshall, Jr.; Wade J. Brady, III; Frederick J. Telecky, Jr.

(57) ABSTRACT

A method to supply audio effects to video games employs graphics information of sound source objects and sound interacting objects in a real time physical model to determine the audio effects. Each sound source and sound interacting object is associated with a computer generated object in the graphical environment. The physical model determines how the sound interacts with the environment at the current object locations and applies the audio effects. The game designer does not need to dub in audio effects artificially in an add-on manner.

8 Claims, 7 Drawing Sheets

KEY:
C = CENTER
FL = FRONT LEFT
VL = VIRTUAL LEFT
SL = SPEAKER LEFT
RC = REAR CENTER
FR = FRONT RIGHT
VR = VIRTUAL RIGHT
SR = SPEAKER RIGHT

AUDIO EFFECT RENDERING BASED ON GRAPHIC POLYGONS

TECHNICAL FIELD OF THE INVENTION

The technical field of this invention is audio processing in computer games.

BACKGROUND OF THE INVENTION

Current video game systems hardware almost universally include a main processor and a graphics processor. The main processor may be a Pentium processor such as in a personal computer (PC). Alternatively, the main processor may be any processor involved in the transmission of program information to a graphics processor. The graphics processor is tightly coupled to the main processor by a very high performance bus with data throughput capability meeting or exceeding that of an Accelerated Graphics Port (AGP). The graphics is also generally coupled via an I/O bus providing an audio processor and includes network connectors for a PCI port. The main processor and graphics processor are tightly coupled to minimize any performance degradation that could accompany the transfer of data from the main processor and memory system to the graphics processor.

The audio system components are usually not viewed as performance critical. Hence the audio system usually resides on a lower performance peripheral bus. This is perfectly acceptable for the audio in current systems. Currently, the highest performing game audio systems have two chief characteristic features.

The first characteristic of high performance game systems is a positional audio scheme. A positional audio system performs dynamic channel gain/attenuation based on the user input and character perspective on a screen in real time. Multi-channel speaker systems typically include five main speakers, a front left, center, and front right speaker, plus a rear left and a rear right speaker. Such systems also include a separate subwoofer, which is a non-positional speaker for bass reproduction. Such an audio system with five main speakers and sub-woofer is referred to as a '5.1 level' system.

If a sound generating source is coming from the left of the on-screen camera position, the gains on the left speakers are increased for that sound. Similarly, the gains for the right side are attenuated. If the user moves the joystick and changes the relative camera position, the channel gains are dynamically modified. The positional audio algorithm will be enhanced in new designs to sound well on a living room quality multi-channel system.

The second characteristic component is a real time reverb. Real time reverb can be run, not mixed with the track but rendered during game play. This creates a sound field effect based on the user environment within the game. For example, if the game moves from an outdoor scene into a cavern, a cavern reverb is applied to all new game produced sounds. Thus a gun shot will have an echo since it is now inside the cavern instead of outside. Several competing game system providers employ this of technology.

Both the positional audio and the real time reverb enhancements require the game designer to create the desired effect at game create time. The effects are then applied during runtime by the audio processor. For example, a cavern hall effect must be added to the game code in the form of "when this level is loaded, apply the cavern effect." The game developer provides this effect which does not require a separate mixed track to be heard. The effect is produced as processing is applied, on the fundamental sound during run time. Thus a normal gunshot could be mixed for only the front left/right speakers.

Additionally, it is possible in a computer game to apply a different reverb to each sound primitive based on the sound source location. Suppose a sound comes from a cave but the listener position is outside the cave. The sound source will have the cave reverb applied, while any sound generated by the listener will not. These real-time effects must be set by the audio designer during the game create time by tagging the sound with the reverb to be applied.

In contrast to the moderate sophistication of current audio techniques, video techniques have advanced at a much more rapid pace. Video game manufacturers have committed ever increasing levels of hardware and software technology to the video image. Video information for game systems is assembled from elementary data and layered in levels to allow for image processing according to superposition principles. Increasing detail is supplied to the image with the inclusion of additional layer information. In a landscape scene, the lowest level is a wire-mesh structure that forms the spatial coordinates upon which objects may be placed. Higher levels contain polygon objects and yet higher levels contain refinements on the shapes of these objects such as rounding corners. With more levels the landscape scene and objects are further refined and shaped to:

1. Add texture to shapes taking them from stark geometrical figures to more realistic appearance;
2. Mix in reflective properties allowing reflective effects to be observed;
3. Modify lighting to add subtle illumination features;
4. Add perspective so that far away objects appear to be smaller in size;
5. Add depth of field so that position down into the image may be observed; and
6. Provide anti-aliasing to remove jagged edges from curves.

These are only a few basic features added in layers superimposed to form the finished image. The amount of image processing required to accomplish this refinement of the video data is enormous. The game starts from a suite of data describing polygons and their placement on a wire mesh as well as the characteristics of each polygon implicitly creating a video landscape to enable the processor to generate highly refined effects.

Currently audio processing carries much lower processing priority. Usually a basic point source sound is converted to digital audio and is modified to take on character of the general environment. For example a gunshot in an auditorium takes on a different character from the same gunshot in a padded cell. The game system programmer provides the basic sounds and their basic modifications that may be switched in depending on the environment. The key point is that presently employed audio technologies provide some effect processing, done in real time, but are statically applied with the core information hand inserted by a game designer during the game create process. Two dimensional graphics operate in that primitive manner with an artist creating the environment and the game merely equipped to load it and display it.

In these current game audio schemes, the game designer predetermines what effects should be applied, and the effects are applied in real-time during game play. The audio engine does not need to know what the actual environment is. These currently available games provide for the insertion of audio effects on an object-per-object basis. For example, a door will have an acoustic property for it to help the current audio engines apply a real-time occlusion effect if the designer says add occlusion.

Next generation game console audio requirements will fall into one of two major operational modes: Bit Stream Playback Operational Mode; and Game Operational Mode. Two game manufacturers have indicated that their next console will be more than a game system. These consoles will be a living room entertainment system. The key audio component in the current living room entertainment system is the audio-visual reproduction (AVR). The soon to be introduced consoles will need to support some AVR functionality. Direct un-amplified multi-channel audio out may be present.

SUMMARY OF THE INVENTION

This invention describes the generation of an audio landscape from detailed geometric audio information included with video information supplied to the video processor. Basic geometric data is coded to include description of not only video but also audio characteristics of objects. This data is used dynamically to generate audio modified from the basic audio sounds to depict the affect of the audio landscape. This requires audio processing power comparable to the precision and speed of the video processing though less demanding in terms of the volume of data. The audio processing capability employed in this manner greatly increases in audio realism in a wide variety of applications.

BRIEF DESCRIPTION OF THE DRAWINGS

These and other aspects of this invention are illustrated in the drawings, in which.

DETAILED DESCRIPTION OF PREFERRED EMBODIMENTS

Currently audio processing carries much lower processing priority than video processing in computer games. Usually a basic point source sound is converted to digital audio and is modified to take on character of the general environment. For example a gunshot in an auditorium takes on a different character from the same gunshot in a padded cell. The game system programmer provides the basic sounds and their basic modifications that may be switched in depending on the environment. Presently employed audio technologies provide some effect processing done in real time, but statically applied with the core information hand inserted by a game designer during game create. This is analogous to primitive 2D graphics where an artist creates the environment and the game merely loads it and displays it.

In these current game audio schemes, the game designer predetermines what effects should be applied. These effects then are applied in real-time during game play. The audio engine does not need to know what the actual environment is. These currently available games insert audio effects on an object-per-object basis. For example, a door will have an acoustic property causing the current audio engines to apply a real-time occlusion effect if the designer says add occlusion.

The present invention describes a completely new way to do entertainment game audio. Instead of preprogramming the audio effects, this invention takes in graphically coded information and uses a physical model to determine the application of audio effects.

Real-time rendering concerns generation of effects rapidly on a computer. Real-time rendering of visual effects is called 3D graphics rendering. This creates a 3D video graphics landscape. These effects may also be aural in the task of 3D audio rendering. In 3D audio rendering the audio engine generates the 3D acoustic landscape. Audio processing must then determine the affect of the landscape on the audio. Coded graphics provide an added field of coded acoustic properties. These elements of acoustic environment textures must be accurately modeled to form the audio landscape.

Each video texture property applied to a 3D object to form the video graphics landscape also includes one or more acoustic texture properties. These properties, such as density, form an acoustic landscape. Each acoustic property is passed to the audio engine at the same time the graphics engine draws the corresponding object. The spatial information of each polygon is passed to both the 3D graphics and 3D audio engine. From these basic video texture (optical) and audio texture (acoustic) properties and polygon spatial information, the video and audio engines will jointly render the effect the object (landscape) will have on any video and sound producing objects. This dynamically controls occlusion, Doppler shift or other of several possible acoustic landscape effects. This produces acoustic effects that are not separately supplied by a special input from the game designer. Adding the acoustic texture properties to the video texture properties enables the audio engine to determine the audio effects.

All polygons have an associated acoustic tag. It is also possible to group a set of polygons into an object and assign a global tag to the object. The tag is attached during the creation of the graphical object in the game designer's toolset. Some currently used game creation tools assign graphical properties to polygons. In the same manner, this invention assigns acoustic properties. Possible useful acoustic properties include density, permeability, opaqueness, reflectivity, resonance properties. Any physical characteristic that affects audio can be an associated acoustic tag.

Audio effects are produced using a physical model of the effects created by a complex sound being launched into a mathematically definable audio landscape. Some applications may also include a hyper-physical model if the game designer wants effects that are not physically based. These could include unfamiliar sounds generated in an unfamiliar space simulator environment. Based on the relative listener position, final heard sound will then contain current game audio effects such as positional audio and environmental effects, but will also have additional more powerful modifying effects applied only by the direct action of the audio engine.

Figure 1:
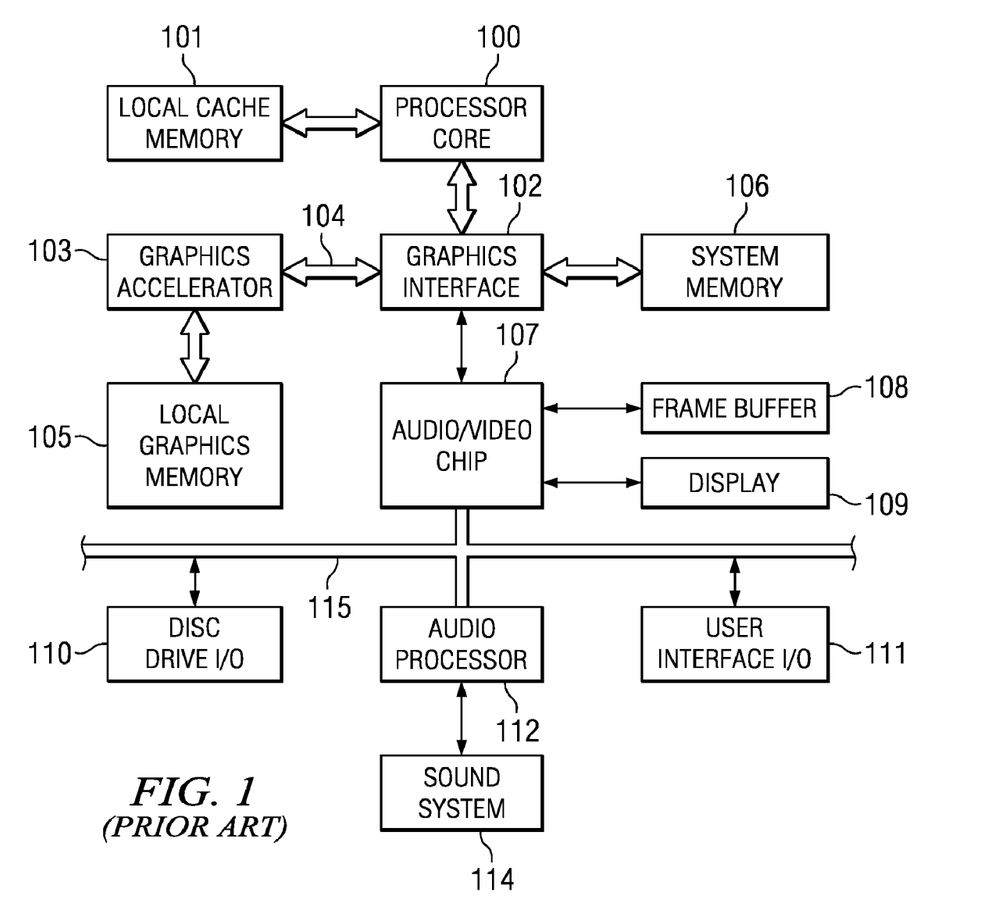
FIG. 1 illustrates a conventional video game system architecture including a graphics accelerator interconnected via a high performance bus and a lower performance bus for non-video data transfer (Prior Art)

FIG. 1 illustrates the hardware architecture currently used in game systems of high quality. The processor core 100 is tightly connected to a local cache memory 101 and a graphics interface chip 102. Graphics interface chip 102 communicates with graphics accelerator 103 via a high speed bus 104. Graphics accelerator 103 draws control and program data from local graphics memory 105. System memory 106 provides bulk storage. Audio/video chip 107 completes the video processing by formatting into frames in frame buffer 108 for output to display 109. Peripheral bus 115 is a lower performance bus designed to interface to audio processor 112 and to disc I/O 110 and user interface I/O block 111. Sound system 114 provides the composite sound output generated by the audio processor 112.

The architecture of FIG. 1 provides exceptionally intense graphics computation power to ensure the graphics quality game players expect from current games. Audio effects, while occupying a place of great importance cannot claim the hardware and software complexity invested in the video generation. Usually the game designer adds audio enhancement as a modifying affect. These canned audio effects suffice where similar video type effects are clearly ruled out.

Current game console audio generally consist of tone generation using a summation of sine waves. Personal computer game audio, although generally played back as a wave file, is also created using tone generation. This is easy on the audio engineer because there is no need to record sound effects. It is simple on the audio processor. However, it generally lacks quality, depth and typically sounds artificial. On a home theater system the audio experience of these games is noticeably poorer than watching a digital video disc (DVD). Recorded sound effects employed by movie makers are much richer since they come from the natural world sounds. As a result, in order to have a DVD or even near-DVD like audio experience during game play, the audio engine must support the playback of files that have already been recorded, not simply generate a tone based on a series of sine wave parameters. This type of audio processing requires an AVR like processing stream such as illustrated in FIG. 2.

Figure 2:
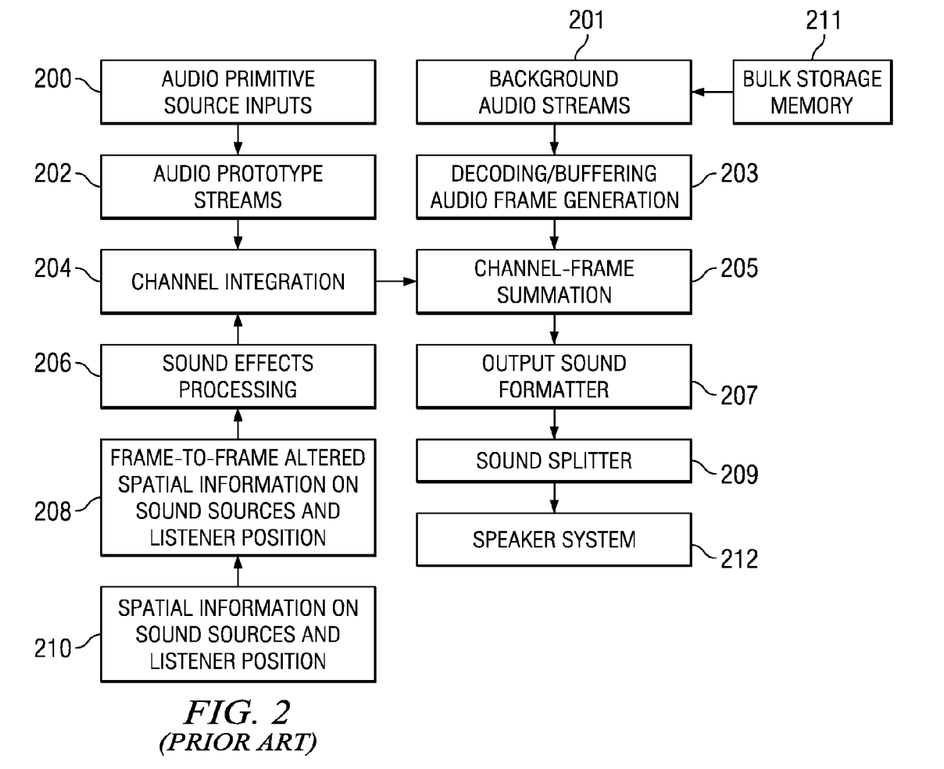
FIG. 2 illustrates the software flow for game operational mode audio processor system (Prior Art)

FIG. 2 illustrates the two fundamental types of audio streams: (a) background audio streams 201; and (b) audio primitive streams 202. A typical game uses a background audio stream and a variable number of primitive audio streams. The background audio streams are limited by the amount of on-chip buffer static random access memory (SRAM) and the number of different sounds the human ear can pick out without it sounding like noise. Background audio and audio primitives are mixed in a CHANNEL/FRAME summation block 205 to create the final output.

The background music is stored in bulk storage memory 211 (hard drive or CD) and is non-interactive. It is created and played back like a conventional compact disc or movie track. Because of their size, these background audio streams 201 are streamed into the audio processor either from the hard drive or from the game program CD. The audio decoder/buffer and audio frame generator 203 decodes this audio data like any normal input stream. The computer game typically supports all input stream file formats and sampling rates in the "Bit Stream Playback Operational Mode." This includes support for AC3, DTS and other commonly used formats. No effect processing, such as positional audio and environmental effect audio, is applied to the background music.

The audio primitives are interactive. FIG. 2 illustrates audio primitive source inputs 200. The first frame of each audio primitive must be stored in on-chip memory and then can be streamed in as audio prototype streams 202. All sound effect processing 206, both the positional audio and environmental effect audio, is applied directly to the audio primitives. The environmental effect applied is based on the sound source environment location. A global environmental effect is applied by the sound effects processing block 206, passed to the channel integration block 204 and then to the channel/frame summation block 205 where the mixed audio primitives are combined. This global environmental effect is based on the listener position relative to where the sound source is generated from spatial information block 210. This global environment is sensed on a frame-by-frame basis in frame-to-frame altered spatial information block 208. Output sound formatter 207 generates the composite sound for the system speakers. Sound splitter 209 performs the separation of this composite sound into its speaker specific sound. Speaker system 212 receives the multiple channels of sound to be produced.

Each audio primitive introduced in the audio primitive source block 200 has an associated active flag with it. If the flag is set, the audio primitive is active and played back a single time. Each active flag also has an associated self-clear or user-clear flag. If the self-clear flag is set, then the audio engine will automatically clear the previously active flag to inactive and trigger a change in audio state event. This audio primitive will execute once. If the self-clear flag is cleared to inactive, then the audio primitive active flag will remain set to active. This audio primitive will loop on itself and repeat until the game program tells the audio engine to clear the active flag to inactive. This is useful, for example, to propagate the constant hum of a car or plane engine.

In this invention, the audio system models sound and listener relative position only and the properties that determine the final sound are determined by the change in listener relative position from the previous state to the current state. This is a fundamental shift in the way audio is processed. This methodology allows for the determination of final sound based on a true physical model that is applied at run time, as opposed to being statically determined on game design.

To determine change in relative position when the next sound state is to be determined, the current x, y (and perhaps z) coordinates of all sound producing objects are stored, along with the listener position. This listener position is usually the object the camera position is focused on in a second or third person view game or simply camera position in a first person view game. This could be at the same rate as the graphics state is determined. This storage of previous state is dynamically calculated. In the current static model, the audio designer must determine ahead of time that a Doppler shift needs to be applied. In this dynamic model, the audio engine software determines if and how much Doppler shift to apply. When mixing the interaction of sounds, physical distance affects which frequency components need to be mixed. In the static model, this has to be determined at the game design time. In a dynamic model, this can be changed. For example, if two sounds start out close to the listener position, all frequency components are mixed. As the objects move away, only the lower frequencies need to be mixed, as this is how the sounds interact in the real world. After calculating the change in state information, effects such as a Doppler shift can now be made based on the change in relative position between all sound sources and listener position. A dynamic model allows for this.

Current audio solutions allow for changes in positional audio, such as speaker gain adjustment in a multi-channel system, in real-time. Other effects need to be determined upon game design, even if the effects are applied in real-time on a game source. The rendering of the effect can not change based on the game state. There is no consideration for change in relative position between two sound sources or listener position.

The solution of the present invention modifies the audio based on a change in relative position between sound sources and listener position instead of merely their current positions. Retention of the previous sound state permits physically modeling of the sound. This permits interaction between sounds to be dynamically determined. The game audio can now be physically modeled according to how the sound would actually be heard in a real-world setting. Interactions between sounds and velocity dependent characteristics such as Doppler shift no longer need to be determined upon game creation. Instead these effects are determined and applied in real-time during game play.

Another benefit is that it is now easier for the game designer to create a real-world sounding game without being an audio expert. The game no longer needs to consider physical effects or the various interactions between sounds. These effects are automatically determined and applied in this dynamic model.

The basic game operational mode requirements as applied in this invention are essentially be the same as a PC audio system of today, but enhanced to generate quality sound on a home theater system. Two main base audio functions will be included in next generation consoles: positional audio; and real-time environmental effects.

The positional audio algorithm makes use of three key properties:

1. A listener position. This is generally the center of the camera view, that is how the gamer sees the game. There is only one listener position. The position of all sound producing sources is localized. There can be multiple sound producing sources that may be triggered at the same time.

2. A sound producing source is an object with an attached sound primitive. An example is a gun shot sound primitive tied to a game character shooting a gun.

3. The distance and orientation of the listener position and the sound producing object during a change in the sound state. This key trigger to the positional audio algorithm is described below.

During game creation, each audio primitive has an associated audio producing object. The same audio producing object may be associated with multiple audio primitives. Each audio producing object has a position in X, Y, Z space. The listener position is always normalized to (0,0,0) in X, Y, Z space for the purposes of the algorithm. When the audio producing object is initially loaded into the game consoles memory, its initial position relative to the listener position in X, Y, Z space is passed to the audio engine.

Four events may change the audio state. They are:

1. The gamer may change the relative listener position by using the joystick or other input device;

2. The gamer may trigger the playback of an audio primitive by hitting a button or other input action;

3. The game program may change the relative sound source position by moving the sound source objects; and 4. The game program may trigger the playback of an audio primitive.

During a change in audio state, the main processor will send an indication of the change in audio state event to the audio engine. This is based on the following:

1. If the change in sound state was driven by the gamer changing the listener position, then the input information, such as pulled back by amount, is passed to the audio engine. The audio engine then changes all the sound source producing object locations by this relative amount keeping the listener position normalized to (0,0,0).

2. If the change in sound state is driven by the game program changing the sound producing object locations, then only that change in the sound producing object location is transmitted. The audio engine changes its relative position in X, Y, Z space.

3. If the change in sound state is caused either by the user or the game program adding or removing an active sound primitive, the active state flag for the sound primitive is either set or cleared.

Figure 3:
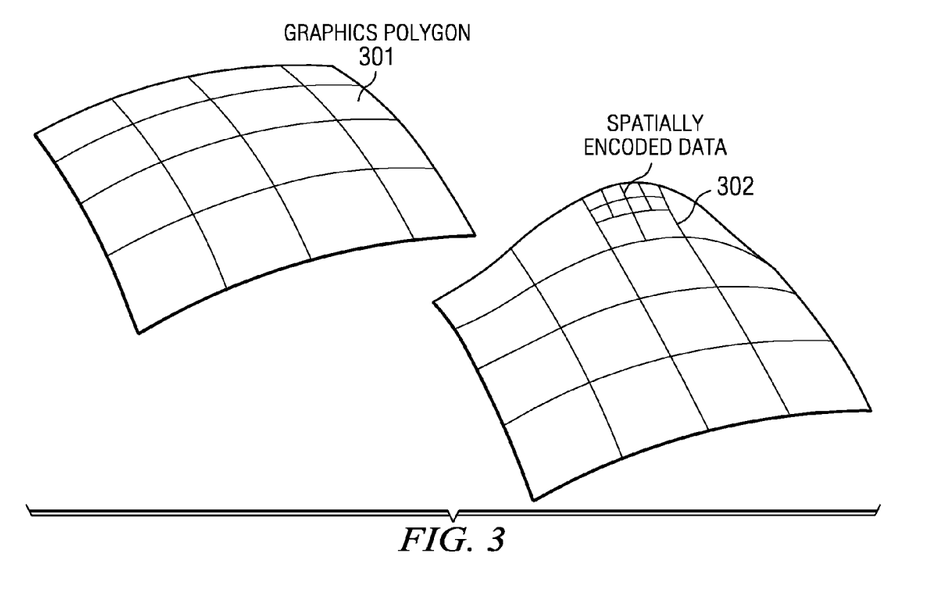
FIG. 3 illustrates a 3D object with an acoustic tag.

This positional audio algorithm is event driven. The positional audio effect engine responds to any change in the audio state. The sound source primitives are assumed to be mixed as if the sound is directly in front and at full peak (i.e. distance is zero) to the listener position. This can be either 2-channel PCM or a multi-channel source. FIG. 3 illustrates a generic graphics polygon mesh 301. Polygon mesh 302 may have encoded data connected spatially with a specific polygon 302 in the mesh.

Figure 4:
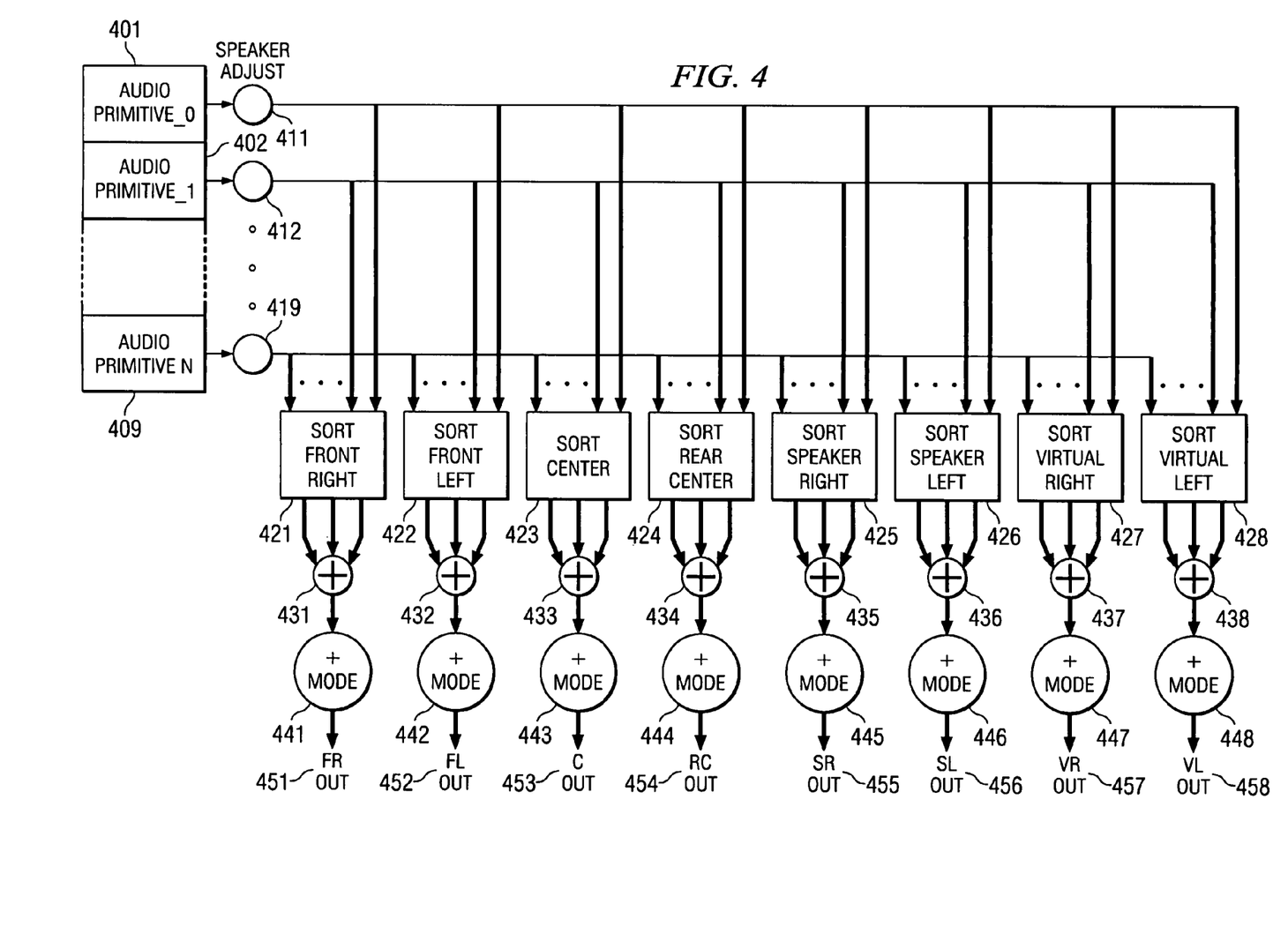
FIG. 4 illustrates the block diagram for positional audio effect engine processing.
Figure 6:
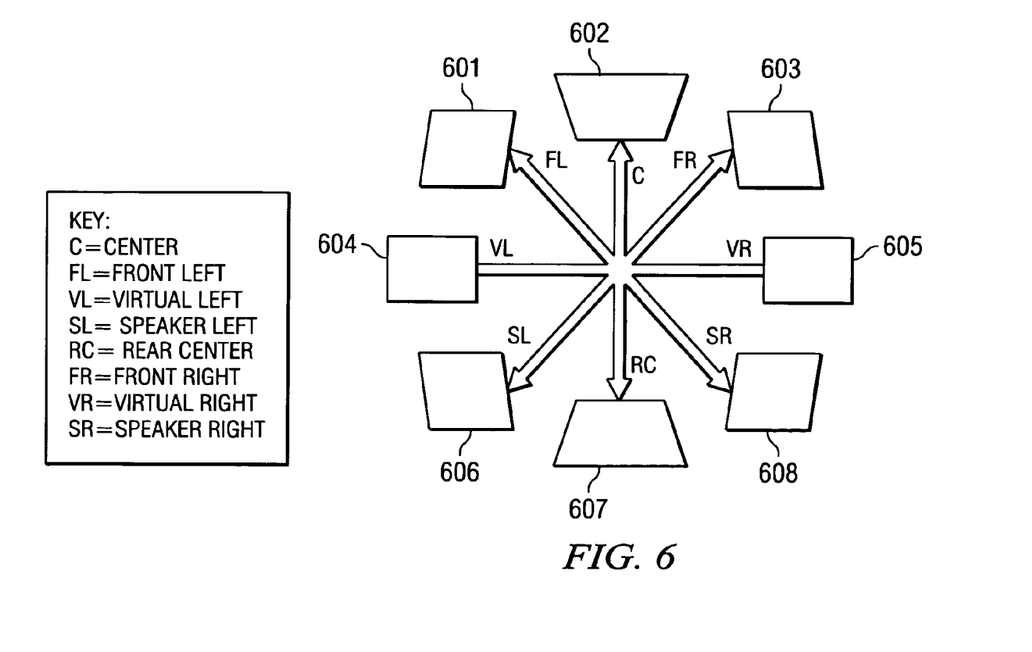
FIG. 6 illustrates the relative game state sound-to-listener orientation to speaker configuration mapping.

The audio engine runs once at the initialization of the sound audio state, and then any time there is a change in the audio state. FIG. 4 illustrates a flow chart for the engine. FIG. 4 illustrates the fundamental relationship between the game state audio primitives and the manner in which they map to speaker positions. Audio primitives are represented in blocks 401 to 409. Speaker adjust pre-processing blocks 411 to 419 prepare the primitives for distribution into the eight channels of output sound 451 to through 458. Sort blocks 421 to 428 perform sorting of the multi-channel primitives prior to summation in blocks 431 to 438. The sort summations undergo mode modification effects in blocks 441 to 448. Outputs 451 to 458 represent the resulting eight-channel sound. These are the final digital value to send to each speaker location. This configuration assumes eight speaker locations for the purpose of determining how to perform speaker adjust, with each speaker equally distant from each other speaker and from the listener position. FIG. 6 illustrates these speaker locations.

Figure 5:
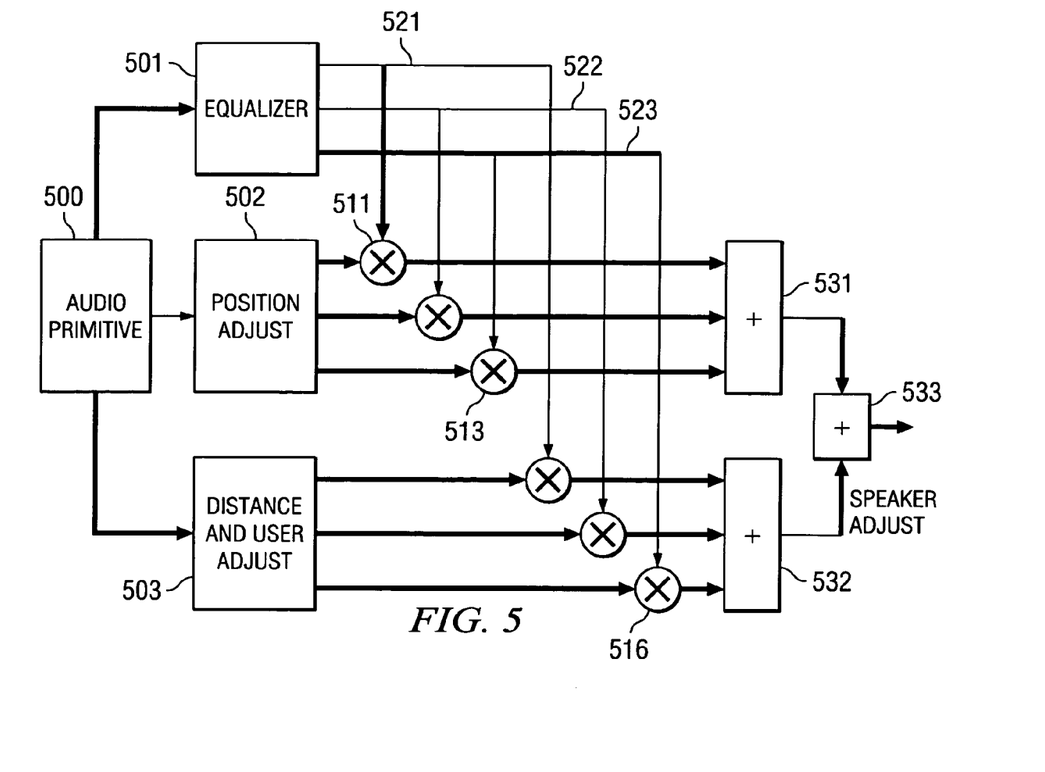
FIG. 5 illustrates a flow chart describing the fundamental relationships between game state audio primitives.

FIG. 5 illustrates an overview of the speaker adjust block 402. A 3-band equalizer 501 runs on each active audio primitive denoted by block 500. This separates each primitive into its low frequency band 521, mid-frequency band 522, and high frequency band 523. Equalizer 501 performs a relative game state sound-to-listener orientation to drive speaker configuration mapping.

Position adjust block 502 performs the $\alpha$ adjust calculations of equations 4 and 5 below. Position adjust block 502 computes the individual gain adjustments for originating speakers $\alpha_1$ and $\alpha_2$ and for remaining channels of non-originating speakers s according to equations 9, 10, 11 below. The distance adjust portion of block 503 computes $\rho$ for equation 3 and completes the calculation of $G_d$ as given in equation 12 below. The user adjust portion of block 503 establishes the value of the parameter U. U is the user adjust value having a default value of 1. U allows the game designer to adjust how distant a sound should be in a given game. Thus U causes the game to have an up close sensation or a far away sensation. Both the positional and distance attenuation factors are applied for all active sound primitives. Product elements 511 through 516 represent the multiply operations of equations 9, 10, and 11. The default speaker configuration is a 6.1 system. In a 7.1 channel configuration, the two back speakers act as one. Two summation stages include summation blocks 531 and 532 for the first stage and summation block 533 for the final stage.

FIG. 6 illustrates the model case for determining how the game state volume control and mixing should occur. The model of FIG. 6 forms the foundation of the positional audio algorithm. The key in FIG. 6 lists the labels for each speaker. FIG. 6 illustrates the ideal model locations of speakers 601 to 608. The AVR manufacturer generally determines how the speakers are actually set up in a home. In the case of using a powered speaker system directly with the game console, the audio settings of the Bit Stream Playback Operational Mode control.

Although the physical speaker system is assumed to be a default 6.1, the audio algorithm assumes the eight speaker positions illustrated in the FIG. 6. The virtual left VL 604 and virtual right VR 605 speaker audio signals are generated using the front and surround left and front and surround right speakers' information and computed from equations 1 and 2.

$$VL = 0.707SL + 0.707FL \quad [1]$$

$$VR = 0.707SR + 0.707FR \quad [2]$$

This gives the equivalent loudness to the listener as if an actual speaker were at the virtual locations with no attenuation. Other game state positions are calculated using polar coordinates, ρ for distance and θ for angle. These polar coordinates are calculated from the angle and magnitude of the x and y coordinates of each position. Converting the x and y coordinates of each primitive into polar form significantly reduces the computational effort to follow. It is possible to apply this calculation in the audio development tool prior to down loading the x and y coordinates to reduce a computation step by the DSP. The distance value ρ must be kept between 0.0 and 1.0. In this model 1.0 is the listener position, and 0.0 is where sound is no longer heard. Therefore, x and y must be normalized prior to calculating ρ in the development tool. The polar coordinates conversion is calculated using equations 3A and 3B.

$$\rho = 1 - \sqrt{x_n^2 + y_n^2} \quad [3A]$$

$$\theta = \arctan \frac{y_n}{x_n} \quad [3B]$$

Where $x_n$ and $y_n$ are the normalized Cartesian (X,Y) coordinates. Once ρ and θ are calculated for each primitive, an attenuation value is calculated for each speaker for each of the low frequency, mid-frequency, and high frequency bands. This maps sound primitive to the appropriate two speakers where sound should originate. If the sound source location is directly on the Y-axis (x=0), then the sound originates from the front left and right speakers and the center speaker or the surround left and right speakers and rear speaker. Otherwise, the sound primitive originates from no more than two speakers. These originating effect speakers are now the relative main speakers for the sound primitive.

Once the two speakers for the originating effect are determined, two alpha adjustments $\alpha_1$ and $\alpha_2$ are applied to the two speakers. The values of $\alpha_1$ and $\alpha_2$ are calculated by equations 4 and 5.

$$\alpha_1 = \left| \frac{L_1 - \theta}{\pi} \right| \quad [4]$$

$$\alpha_2 = \left| \frac{L_2 - \theta}{\pi} \right| \quad [5]$$

The speaker attenuation for all the remaining speakers is dependent upon the frequency component. These attenuation adjustments can be made according to equations 6, 7, and 8.

$$G_L = -6\text{dB} \quad [6]$$

$$G_M = -12\text{dB} \quad [7]$$

$$G_H = -18\text{dB} \quad [8]$$

where the subscripts L, M, and H signify the low frequency, mid-frequency, and high frequency ranges respectively.

The two originating speakers are attenuated by the values given in equations 9 and 10.

$$G_{1\alpha} = G_f \alpha_1 \quad [9]$$

$$G_{2\alpha} = G_f \alpha_2 \quad [10]$$

Equations 4 and 5 determine the weighting ranging between 0 and 1 of attenuation to apply to the two originating speakers. This weighting is determined by relative position between these speakers. Equations 9 and 10 illustrate using this weighting to determine how much of each of the frequency dependent gain from equations 6, 7, 8 to apply. $G_f$ represents gain within the frequency range.

The attenuation of remaining channels $G_{s\alpha}$ is determined by:

$$G_{s\alpha} = G_f \quad [11]$$

Where the s subscript represents the remaining non-originating speakers. This attenuation is for the positional characteristics only. Once the positional attenuation is computed, the distance ρ attenuation is applied. The distance attenuations for each of the two originating speakers is:

$$G_d = G_f \rho U \quad [12]$$

Where U is the user adjust, whose default value is 1. This allows the game designer to adjust how far sound should be in a given game. This determines whether the game has an up close feel or a far away feel. Both the positional and distance attenuation factors are applied for all active sound primitives.

$$V_{1p} = _{L,M,H} G_{1\alpha} + _{L,M,H} G_d \quad [13]$$

$$V_{2p} = _{L,M,H} G_{2\alpha} + _{L,M,H} G_d \quad [14]$$

$$V_{sp} = _{L,M,H} G_{s\alpha} \quad [15]$$

Following calculation of active sound primitives volume output for each speaker, they are sorted from highest to lowest. Each speaker output is then summed up to a total of 0 dB. Once 0 dB is reached, any lower volume primitives are discarded for that speaker to prevent clipping.

In summary, the game state volume adjustment due to the positional audio algorithm is:

$$V_{nV} = V_{np} 0 \quad [16]$$

The final mix with the background music also has this volume restriction. Once the total primitive speaker volumes are calculated, the remaining volume headroom is used as an attenuation value for the background music. This attenuation value is calculated as follows:

$$G_{Mn} = 0 - V_{nV} \quad [17]$$

where the n subscript identifies the speaker location in question.

The music mix for each speaker is then attenuated by this value. The final attenuated music mix and primitive mix is the final mix used to the speakers. Therefore:

$$V_{1T} = V_{1V} + G_{M1} \quad [18]$$

$$V_{2T} = V_{2V} + G_{M2} \quad [19]$$

$$V_{sT} = V_{sV} + G_{Ms} \quad [20]$$

Figure 7:
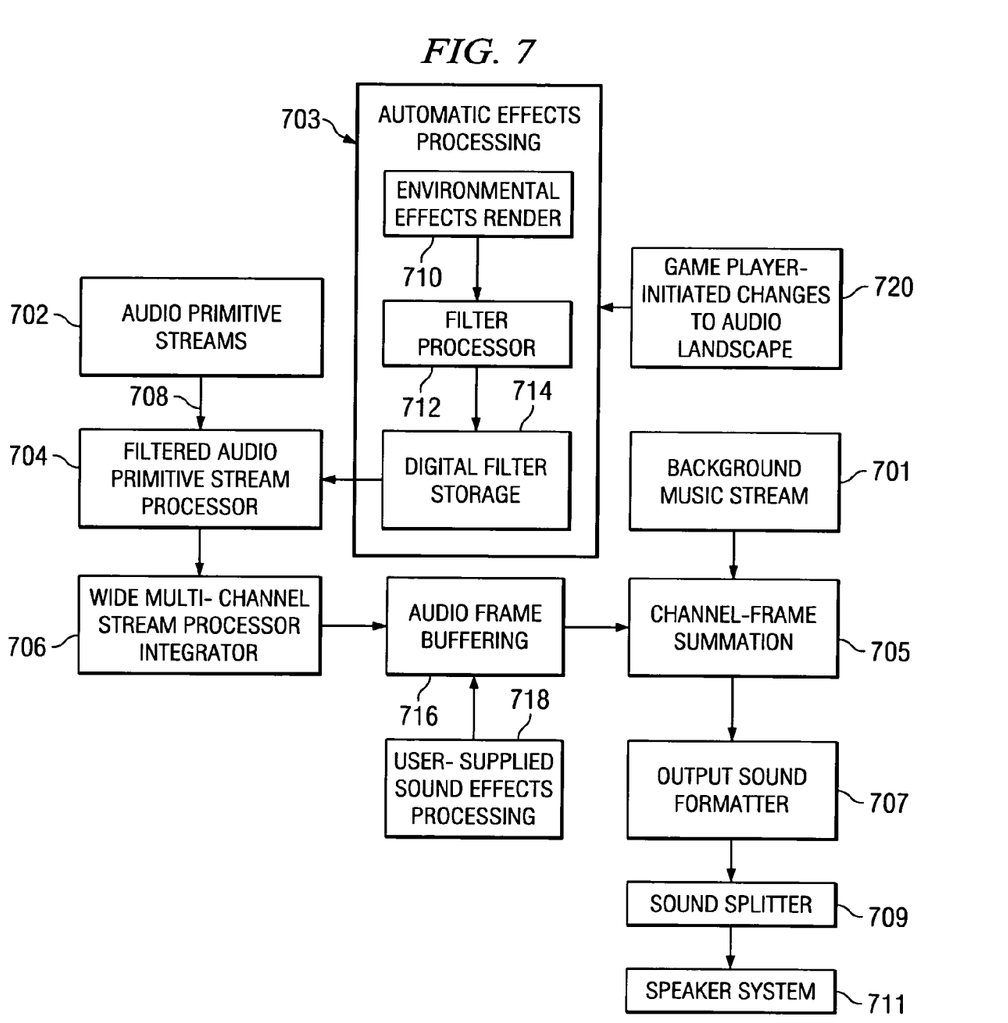
FIG. 7 illustrates the software flow for the dynamic sound source and listener based audio rendering of this invention.

FIG. 7 illustrates the two fundamental types of audio streams: background music streams 701; and audio primitive streams 702. In a typical game, the background music stream and a variable number of audio primitive streams are processed and then mixed in the channel frame summation block 705 to create the final output. The audio primitive streams are limited by the amount of on-chip storage available and the number of different sounds the human ear can discern as different from the interference of surrounding noise.

The background music stream 701 is stored in bulk memory such as hard drive or CD. Background music stream is non-interactive. It is created and played back like a conventional compact disc or movie sound track. Because of the size of this file, the track will be streamed into the audio processor either from the computer hard drive or the game CD. All input stream file formats and sampling rates that are supported in the Bit Stream Playback Operational Mode can be supported including AC3, DTS and other commonly used formats. The audio processor applies no effect processing directly to the background music.

Audio primitive streams 702 are interactive. The first frame of each audio primitive must be stored in on-chip memory. The audio primitive data may then be streamed in on available S/PDIF inputs 708 to filtered audio stream processor block 704. S/PDIF is the bus of choice even for a closed system, because it most mirrors an AVR system. However, these streams could be fed into the audio processor in a number of different ways. Supported file formats and sample rates are the same as the background music. Most will be simply two-channel PCM files. Longer duration primitives or those primitives requiring a more full experience may be multi-channel encoded using an industry standard format.

Automatic effects processing 703 for audio primitive streams includes compiling changes to DSSLP state from game player initiated changes 720 to source and listener positions. Block 710 continuously updates this dynamically altered DSSLP data passes it to DSSLP processor 712. DSSLP processor 712 generates the current state DSSLP, which is stored in block 714. This current state DSSLP data is used to configure the digital filters of block 704 as required to process the audio primitive streams 702. Processor block 704 applies the required filtering to the audio primitive stream.

These filtering effects are accomplished within the audio rendering blocks contained within a wide multi-channel stream processor integrator 706. User supplied sound effects processing can be applied by block 718 to the audio primitive output stream and combined in audio frame buffering block 716. The fully processed mixed audio stream is passed to the channel/frame summation block 705. Channel/frame summation block 705 mixes the audio primitives and background music streams.

Each audio primitive introduced into the filtered audio primitive stream processor block 704 has an audio primitive stream processor with an associated active flag. If the flag is set, the audio primitive is active and played back a single time. Each active flag also has an associated self-clear or user-clear flag. If the self-clear flag is active, then the audio engine will automatically clear the previously active flag to inactive and trigger a change in audio state event. If the self-clear flag is inactive, then the audio primitive active flag will remain set to active. This causes the sound primitive to loop on itself until the game program tells the audio engine to clear to change its active flag to inactive. This is useful to propagate the constant hum of a car or plane engine.

As described earlier in reference to FIG. 2, the output from the channel/frame summation block 705 is passed to the sound formatter 707. Sound formatter 707 generates the composite sound for the system speakers and the sound splitter 709. Sound splitter 709 in turn performs the separation of this composite sound into its speaker specific sound. The speaker system block 711 receives the multiple channels of sound to be produced.

Figure 8:
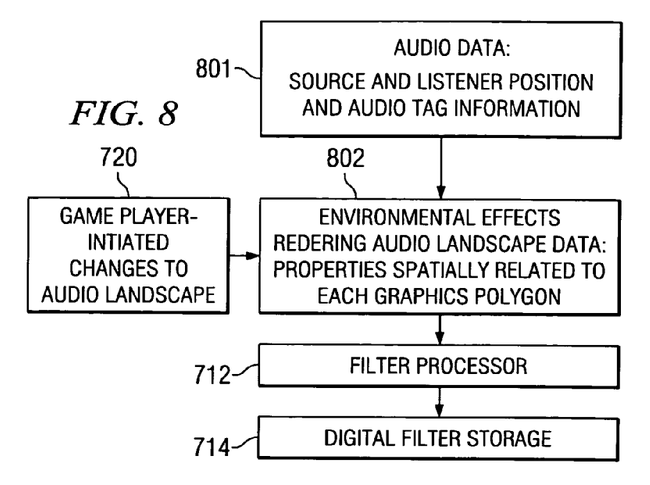
FIG. 8 illustrates the automatic effects processing portion of the 3D rendering audio processor system of this invention.

FIG. 8 illustrates the automatic effects processing portion of the 3D rendering audio processor system of this invention. Audio data inputs from block 801 include a list of all source sound and listener positions and audio tag information. The audio landscape data is generated in block 802. Each polygon of the Audio Landscape data contains a code with the following information:

1. Source Position
2. Listener Position
3. Audio Effects Code

Each graphics polygon has attached to it a code indicating its position and whether audio sources or listeners are located there and a corresponding acoustic properties code. The character of a particular polygon and its effect on audio introduced at that location could be described in a wide variety of parameters. The audio effects code must indicate the weight that will be given to each of several possible audio effects. These could include the following:

A. Occlusion
B. Absorption
C. Damping
D. Reflectivity
E. Echo
F. Resonance
G. Reverberation
H. Muffling The audio processors operates on audio landscape data 802 to generate in the filter processor 712. Filter processor 712 is a dynamically changing filter configuration that determines the proper filtering of sound emanating from each of the audio source locations. This filter processor 712 relates the position of each listener relative to each sound source. Finally this digital filter configuration is stored in digital filter storage block 714 for use in the real-time rendering computations. Filtered audio primitive stream processor 704 illustrated in FIG. 7 performs this intensive real-time rendering computation.

Figure 9:
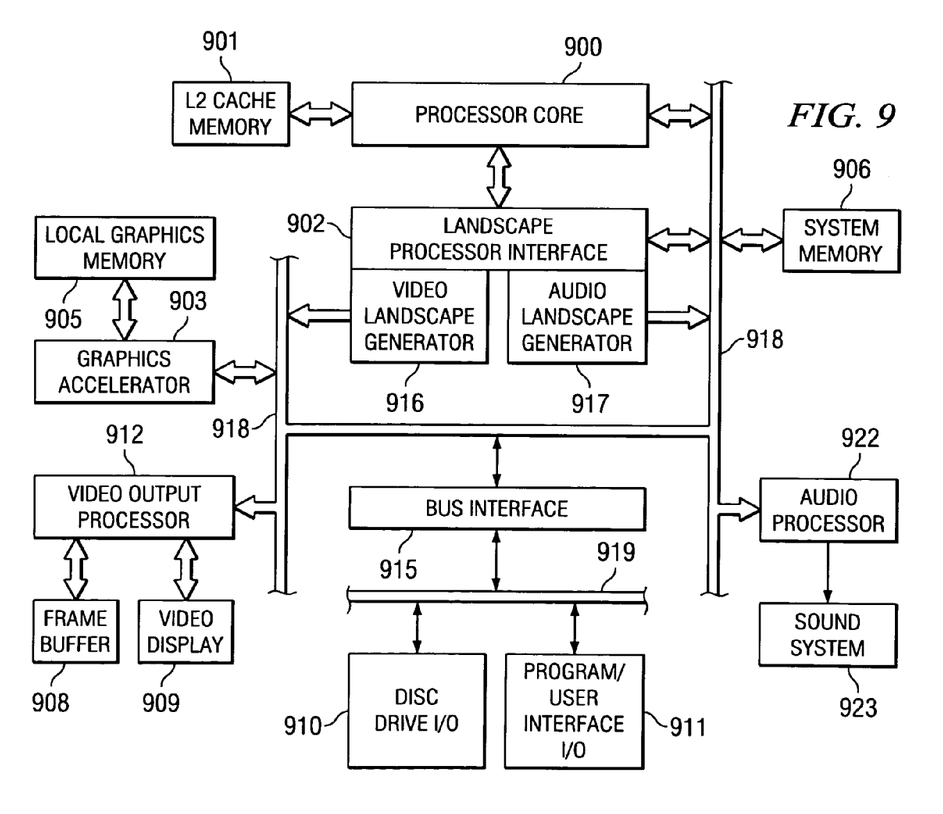
FIG. 9 illustrates the advanced audio/video processor required for dynamic sound source and listener based audio rendering as described in this invention.

FIG. 9 illustrates the game architectural and bus changes required to implement a newer high performance bus system to provide for this invention. The video and audio portions of the architecture are on more equal footing. Processor core 900 is driven from control information stored in cache memory 901. Processor core 900 and several other key elements reside on a high performance bus 918. Processor core 900 interfaces directly with landscape/DSSLP data interface 902 generating a complete description of both the video landscape 916 and the audio landscape 917. The real-time updated description of the DSSLP current state allows for real-time rendering of audio effects.

The real-time graphics processing employs graphics accelerator 903 and associated local graphics memory 905. Video output processor 912 uses the generated data to drive the frame buffer 908 and the video display block 909. Audio processor 922 employs system memory 906 storing previous state DSSLP information and generates new current state DSSLP audio information stored in current state DSSLP generator 917. Real-time audio processor 922 in turn drives the sound system 923.

The system also includes a peripheral bus 919 having lesser performance than high performance bus 918 to interface with disc drive I/O 910 and program/user interface I/O 911. Bus interface 915 provides interface and arbitration between the high performance bus 918 and the peripheral bus 919.

Yet another benefit of this invention is that this model mirrors current 3D graphics rendering models. In these graphics rendering models only the changes that occur in the image are calculated and applied. Thus the mostly graphics oriented game designers can more easily grasp the audio model. Similar techniques and effects done for graphics (such as dynamic lighting and shadowing) are thus directly applicable to the audio. The following example illustrates the difference in the approach of the present invention to that of current technology in generating Doppler effects in the audio system.

The following example is given to illustrate the difference in the approach of the present invention to that of current technology in generating reverberation effects in the audio system. Reverberation mimics the early and late reflections of sound that occurs when it interacts with its environment. In current technology, this is done by modeling the room and determining a series of coefficients to apply to a comb filter. Current technology approaches reverb in a manner similar to Doppler shift. A series of reverb data is passed to the audio processor which applies the reverb to the audio stream. Instruction of how apply the reverb must be supplied by the audio designer. Thus reverb data is hand inserted into the game state and the main processor tells the audio processor explicitly where reverb is to be applied.

In the present invention, the audio processor needs input data beyond simple user input from the main processor. In addition to positional information, the audio processor needs the physical environment information from the graphics processor so that it can re-create the audio landscape independently and determine how the environment should sound. The audio processor draws the environment and thus does not apply a reverb in the traditional sense. The audio processor does not model the environment because the details of the environment have already been captured. The audio processor next applies a model using physical principles to establish how sound waves propagate in the environment.

This invention operates as follows. First, the 3D graphical information is passed to the audio processor in order to build the environment. To ascertain the timing requirements for audio processing, consider operation of 3D graphics processors. A 3D graphics processor usually measures processing rate in frames per second (fps). This is the number of times it can refresh a monitor with the new landscape per second. To prevent observable image stuttering, this processing rate must be greater than about 30 fps. Audio rates are slower. The human eye is much more sensitive to changes than the ear. The ear is an order of magnitude slower than the eye. Thus the audio image needs to be refreshed about three times a second to avoid audio stuttering. At least three times a second, the 3D graphics processor sends its graphical state to the audio processor. Generally the 3D graphic processor calculates a visual refresh at least 30 times a second.

There are two main properties that the audio processor requires from the graphics processor. The first is the texture of the acoustic tag. This could be the permeability of the computer created object or an estimated permeability if the game is supposed to sound alien. The second is the location of that texture. Either the graphics processor may pass this information to the audio processor or the audio processor may create the audio texture from the polygon information controlled by the graphics processor. Every three seconds, the location and permeability of all textures are sent to the audio processor. The audio processor already has the locations of sound sources and the listener position. This data may be compressed or reduced to fewer locations using appropriate algorithms to control the amount of computation required.

Every main loop, which occurs three times per second, the audio n does the following:

1) Upon triggering each new audio event, the audio propagates from its sound source. In current systems this is not even considered at all. Audio that is triggered is heard right away. In this invention, an audio state is created at a rate that is orders of magnitude faster to update. This should be at least three times per second.

2) Prior audio states advance to a new state based on the speed of sound in its environment. For example, note that sound travels at 331.4+0.06 T meters/sec. This is about 333 meters/sec at 25 C. With three updates per second, the sound traveling a distance of 111 meters in the environment every state advance.

3) For each object that is within the 111 game-state meters, a certain amount of the wave energy is reflected and some amount passes through. This is normalized to unity for full peak. This create a new sound source as the original wave is now two waves. Prior waves can be discarded.

4) As each wave comes into contact with another wave, it then interacts. These interactions are computed based on standard wave theory. These calculations are dependent on frequency, power and vector direction. This will result in two new waves and the prior two waves can be cancelled out as both previous waves have been frequency shifted and vector shifted by their interaction.

5) Any wave that reaches the listener position is then heard. These waves will contain their own attenuation value and orientation and are calculated by known algorithms. Any interaction between sounds and its environment in effect causes the destruction of the original sound and the creation of either one or two new sound sources as part of the original wave is reflected in the opposite direction and what passes through the object.

6) This iterative process must be curtailed at some point. A power threshold is assigned. Once a wave falls below this power threshold, it can no longer be heard so it should be dropped. Every new audio state will have a corresponding reduction in wave power determined by wave theory.

Figure 10:
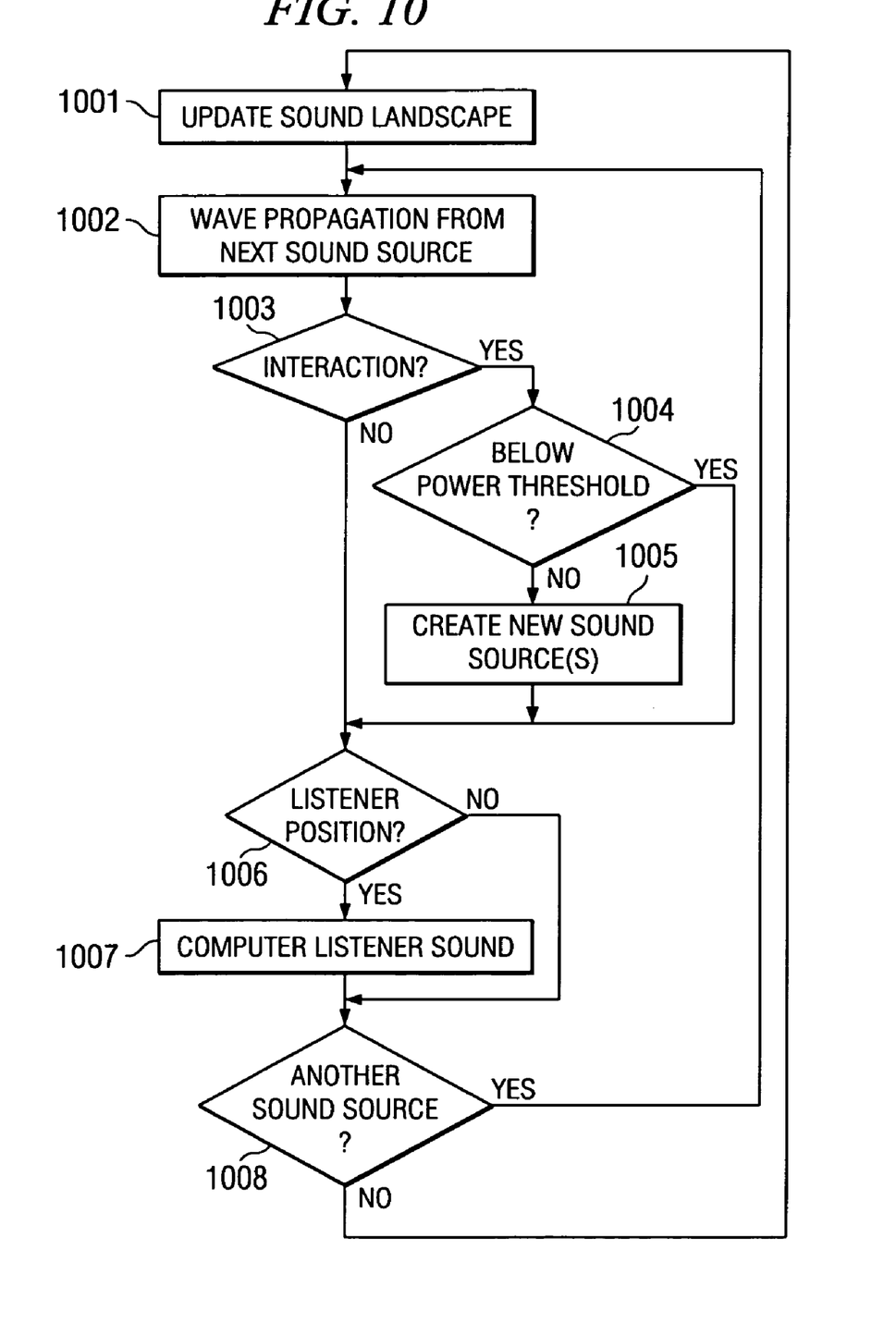
FIG. 10 is a flow chart illustrating the computation of environmental effects according to this invention.

FIG. 10 illustrates a flow chart of this process. The process begins each time cycle by updating the sound landscape (block 1001). This update includes data regarding new relative positions of sound producing objects and any change in the environment that changes the sound experience. The audio processor next begins wave propagation for the next sound source object (block 1002). The first time through this loop the next object is a first object. This wave propagation could employ any of the techniques pristine audio rendering, transform-based audio rendering or model-based audio rendering described below. The audio processor tests for sound interactions (decision block 1003). As previously described these interactions could be between sound waves of differing sources or a sound wave encountering an acoustically active object. If there is such an interaction (Yes at decision block 1003), then the audio processor tests to determine if the interaction is below the predetermined power threshold (decision block 1004). This test cuts off computation for interactions which cannot be heard (Yes at decision block 1004). If the interaction is above the power threshold (No at decision block 1004), then the audio processor creates one or more new sound sources (block 1005). As previously described, in general when a sound wave encounters an object there is both reflection and transmission. The source character of these new sound sources depends upon the original sound wave and the acoustic properties of the object. Any newly created sound source is added to a list for propagation and possible secondary interactions.

The audio processor determines if the sound wave reaches the listener position (decision block 1006). If the sound reaches the listener position (Yes at decision block 1006), audio processor computes the sound received by the listener (block 1007). If there is another sound source (Yes at decision block 1008), the control returns to block 1002 for computations regarding the next sound source. Otherwise (No at decision block 1008), audio processor waits for the next sound landscape update (block 1001).

There are several levels of complexity for a real time audio rendering scheme. These are described below as: pristine audio rendering; transform-based audio rendering; and model-based audio rendering. System design choices based on these options dictate system parameters and strongly influence cost and market viability.

Pristine audio rendering represents an enormously complex compute-intensive methodology based on fluid dynamics of air that transmits sound. Each sound includes multitudes of individual vibrations and the fluid dynamics dictate the manner in which these vibrations travel through the audio landscape. The resultant sound received is computed from the contributions of all reflections, absorptions, reverberations, as well as motion (e.g. Doppler effects) experienced by the individual source vibrations. Clearly it is an enormously daunting task to render audio in this fashion. Because of its prohibitive complexity and cost, pristine audio rendering as defined even loosely here will unlikely have impact on near term audio-video technology.

Transform-based rendering builds the audio landscape mathematically from the audio-tagged graphics polygons and reduced to a set of matrices describing the aural-physical properties of this audio landscape. These matrices are composed or reduced to a basic transformation that transforms source sounds in the manner in which they are received as a result of the properties of the environment. This reduction means that second or third order importance environmental effects can be ignored. Source sounds are generic because they are synthesized from audio spectrum components. Thus a car engine is made up of all the contributing frequency components rather than that of a complex digitized model. In transform-based rendering, dynamic models of the sound and of the environment are generated by synthesis or computed in real time. Only model elements that are clearly re-usable such as portions of the landscape or elementary sound sources are stored.

Model-based audio rendering builds the audio landscape mathematically from the audio-tagged graphics polygons and reduced to a set of matrices describing the aural-physical properties of this audio landscape. These matrices are composed or reduced to a basic transformation that switches in alternate models of the source sounds themselves to simulate the acoustic effects of the audio landscape. The source sounds are only stored models. Decisions as to which models are switched in at a given time are made dynamically but real-time computations of how basic models are transformed by the landscape are avoided. This model-based has requires many more models and more storage than the other models.

Blended rendering makes better use of the graphics hardware and software. Blended rendering uses a blended form of both transform-based rendering and model-based rendering. Some sounds are switched in such that that for the audio landscape is largely ignored. Other higher priority sounds are given the highest level of transformation detail and hence the highest quality rendering.

The present invention obviates the need for a game developer to provide audio effects by direct intervention of the game systems programmer while still providing the highest quality audio environment for all possible game scenes. The technique of the present invention dynamically determines each needed audio effect and how that effect should be heard. This exploits the manner in which 3D rendered graphics operate. Three dimensional graphics engines do not load pre-built background maps for the environment. A 3D graphics engine constantly draws the environment based on a skeleton and overlays it with a texture. Consider the example of drawing a room. The main processor sends spatial information to the graphics engine telling where the edges are supposed to be. This spatial information takes the form of an x, y, z coordinate for each point to draw a frame. The more points that are provided, the more realistic the background will look. Once the graphics engine has all these points, it connects them using a wire-mesh and then places a texture created by an artist on each triangle of the mesh.

This approach requires a significant amount of processing by the graphics engine, and a tight coupling between it and the CPU. This is because in the 3D world, it is possible to automatically apply various visual effects without having designer interaction to create the effect. For example, dynamic shadows are automatically calculated and applied based on the light source distance, height and a shadow-producing object such as a person. A designer never needs to create a shadow. The graphics engine can be programmed to apply it automatically. The 3D graphics engine can do this is because it knows how the shadow-producing object is built. It has the spatial information regarding how the environment is built and information on the location of all the light producing objects. The result is a game having more realistic appearance. Minimal additional effort is required from the game development team.

This invention is an extension to the audio realm of the principles conventionally used in 3D video. If the audio engine also receives the graphical information, it too can build the environment and then create and apply the various environmental effects. This is a fundamental re-thinking of how to produce the audio effects for a game. The result is that audio game technology can move from 2D pre-built graphics world to a more powerful 3D dynamically generated world. A game designer will not have to design in a cavern effect for example. The audio engine will determine the spatial properties of the environment and apply a physical model on how the sound will be affected.

To implement these features the audio processor can no longer be on the slower peripheral bus. Rather it must be tightly coupled to both the main processor and graphics engine as illustrated in FIG. 9. This is a fundamental hardware change. The audio engine interface must contain the same signal information/memory bandwidth requirements as the graphics engine, whether it is available from another AGP port in a computer or a branch from the main processor/graphics processor path to the audio.

What is claimed is:

1. A method of sound processing to be used in systems utilizing computer generated graphics polygons comprising the machine implemented steps of:

defining at least one sound source, each sound source attached to a first computer generated polygon;

defining a plurality of second computer generated polygons, each second computer generated polygons having at least one associated acoustic property;
periodically
  determining relative positions between each first computer generated polygon, second computer generated polygon and a listener position, and
  computing a resultant sound at the listener position of an interaction between sound generated by each sound source attached to a first computer generated polygon and the associated acoustic property of the plurality of second computer generated polygons, said step of computing including
  determining when sound from each sound source reaches a second computer generated polygon,
  creating at least one supplemental sound source at a time when sound from each sound source reaches a second computer generated polygon at a location of said second polygon having a character dependent upon the sound from the at least one sound source, the location of the second computer generated polygon and the at least one associated acoustic property of the second computer generated polygon, and
  computing a resultant sound at the listener position of an interaction between sound generated by each supplemental sound source and the associated acoustic property of the plurality of second computer generated polygons.

2. The method of claim 1 wherein:
the at least one associated acoustic property of said second computer generated polygon includes reflectivity;
said step creating of at least one supplemental sound source includes creating a reflectance supplemental sound source corresponding to sound from said at least one sound source reflected from said second generated polygon at said associated reflectively.

3. The method of claim 1 wherein:
the at least one associated acoustic property of said second computer generated polygon includes permeability;
said step creating of at least one supplemental sound source includes creating a transmission supplemental sound source corresponding to sound from said at least one sound source transmitted through said second generated polygon at said associated permeability.

4. The method of claim 1 wherein:
the at least one associated acoustic property of said second computer generated polygon includes resonance;
said step creating of at least one supplemental sound source includes creating a resonance supplemental sound source corresponding to sound from said at least one sound source resonating with said second generated polygon at said associated resonance.

5. The method of claim 1 wherein:
said step of computing a resultant sound at the listener position further includes
  not creating a supplemental sound source at a location of said second polygon if a computed power of said supplemental sound source is below a predetermined power threshold.

6. The method of claim 1, wherein:
the step of computing a resultant sound at the listener position includes
  storing a sound source model corresponding to each sound source attached to a first computer generated polygon,
  building an audio landscape mathematically from the acoustic properties of said second computer generated polygons,
  reducing the audio landscape to a set of matrices describing a basic transformation of source sounds by the audio landscape ignoring second and higher order importance environmental effects, and
  filtering the sound of the at least one sound source by the set of matrices.

7. The method of claim 1, wherein:
the step of computing a resultant sound at the listener position includes
  storing a plurality of sound source models corresponding to each sound source attached to a first computer generated polygon,
  building an audio landscape mathematically from the acoustic properties of said second computer generated polygons,
  reducing the audio landscape to a set of matrices describing a basic transformation of source sounds by the audio landscape ignoring second and higher order importance environmental effects, and
  selecting one of the plurality of sound source models as said resultant sound for each sound source corresponding to the at least one sound source filtered by the set of matrices.

8. The method of claim 1, wherein:
said step of periodically determining relative positions and computing a resultant sound occurs at least three times per second.

* * * * *